April 5, 1960
O. KRISE
2,931,416
MILK CASE STRAIGHTENER
Filed May 20, 1958
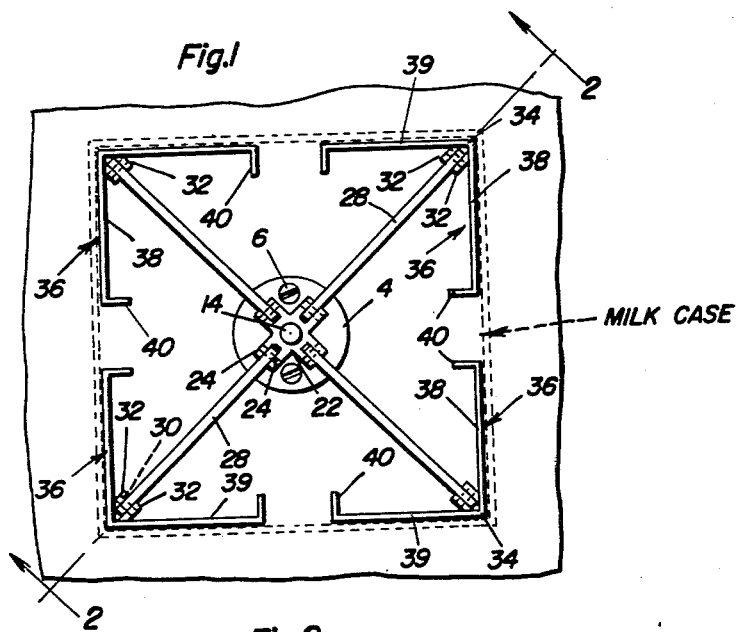
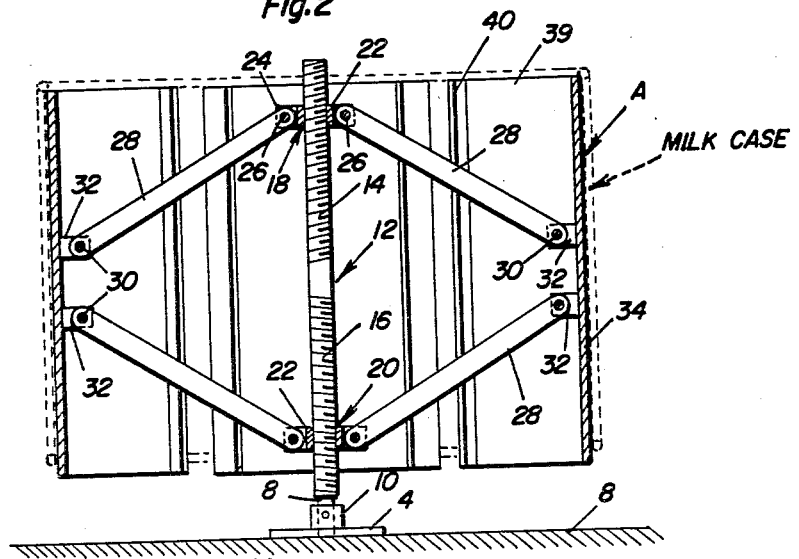
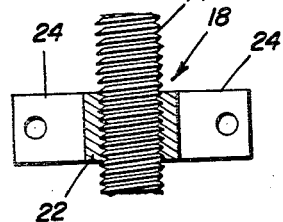
Otis Krise
INVENTOR.

United States Patent Office 2,931,416
Patented Apr. 5, 1960

2,931,416
MILK CASE STRAIGHTENER
Otis Krise, Lafayette, Ind.
Application May 20, 1958, Serial No. 736,509
1 Claim. (Cl. 153—32)

The present invention relates to a simple, practical and economical device which is expressly, but not necessarily, adapted to be put to practical use in a dairy or similar establishment, the purpose thereof being to assist a user thereof in straightening a wire or an equivalent milk case.

Most dairies currently use a fabricated wire or an equivalent case or crate, usually 12" x 12" for racking and delivering milk sold in cartons. As is true in any service involving the delivery of goods and commodities containers such as crates, cases and the like, are invariably subjected to rough handling and inconsiderate treatment. Naturally, these cases are therefore bent, distorted and otherwise forced out of shape until they are not satisfactorily usable. The problem posed is one to economically restore a damaged milk case to its original shape and form so that its serviceable use will be greatly prolonged. The objective in the instant matter is to solve the problem and this can be and is herein accomplished through the medium of an expansible and contractible stand over which the milk case is temporarily placed and restored to its near-original-shape.

More specifically the invention, in a preferred embodiment thereof, is not only a so-called stand but is, in effect, a simple mechanical screw-jack having a novel sectional head, the sections or components of which take the form of flat faced anvils which may be satisfactorily used with the aid of a mallet or the like to hammer out distortions and bent portions and to repair the case to a degree that it is sufficiently straight and restored for continued use.

In carrying out a preferred embodiment the jack comprises a base, an oppositely threaded feed screw connected to and rising from the base, a plurality of anvil-like sections providing the components of the sectional head, and means for linking the sections to the feed screw by way of adjusting nuts. The head is such that the damaged milk case is merely turned upside down and fitted over the sections or components of the head whereupon the whole head is turned about the feed screw resulting in the walls of the case being initially pressed and straightened, after which the indented and bent areas of the walls may be hammered and suitably restored.

Other objects, features and advantages will become more readily apparent from the following description and the accompanying drawing.

In the drawing wherein like numerals are employed to designate like parts throughout the views:

Fig. 1 is a plan view of a milk case straightener constructed in accordance with the invention and showing, in phantom lines, how the milk case is positioned thereon for restoration.

Fig. 2 is a section on the line 2—2 of Fig. 1, looking in the direction of the arrows.

Fig. 3 is an enlarged fragmentary view of one of the spiders or hubs.

With reference now to Figs. 1 and 2 in particular the simple stand comprises a suitable base or plate 4 which may be fastened by screws or the like 6 (Fig. 1) atop a work bench or equivalent stationary work support surface 8. Fixed at its lower end 8 in the upstanding collar 10 at the center of the base is the aforementioned perpendicular feed screw 12. The oppositely threaded upper and lower screw-threaded portions of the feed screw or shaft 12 are denoted at 14 and 16 and these are adapted to accommodate the cooperating upper and lower spider-like hubs 18 and 20. The hub portion in each instance is virtually a simple feed nut 22 and the radial ears connected therewith are denoted at 24 and are in spaced parallel pairs. These ears serve to accommodate the inner pivoted end portions 26 of the circumferentially spaced links 28 of the upper and lower spreadable and contractible linkage assemblies. The outer end portions of the links 28 are pivotally connected, as at 30 to pairs of spaced parallel lugs 32 integrally joined with the corner or vertex portions 34 of the head components or sections. These components are denoted individually by the numeral 36. Each section is of angular form, that is made up of flat plate portions 38 and 39 which are disposed at right angles to each other and are joined at the junctional corner 34. The free edge portions of the plate portions are reinforced by the addition thereto of flanges or equivalent stabilizing members 40. Thus a simple expansible and contractible head construction is provided which is in effect a press. In many instances by merely slipping the milk case A upside down over the head and then turning the case and head as a unit in the proper direction the expanders or head sections 36 will sufficiently force and straighten out the irregularities in the cooperating case walls. Where the distortions and bent portions are such that they cannot be easily pressed and restored, the plate-like components 38 and 39 are used as anvils and with the aid of a mallet the bends, kinks and other distortions are hammered out. One with little or no experience can learn to use the invention in making case repairs in a minimum amount of time and with minimum effort and labor involved. Turning the case and head in one direction takes care of the initial pressing and subsequent pounding, if any. Switching the head and case back in the other direction of course contracts the head sections 36 and allows the repaired case to be readily loosened and removed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A polygonal milk case reshaper comprising, in combination, a shaft, including oppositely threaded portions, fixedly mounted on a stationary support, nuts operable on the oppositely threaded shaft portions, and a polygonal, expansible and contractible head rotatable about said shaft and engageable in the case, said head including a plurality of angular work-engaging plates engageable in corner portions of the case for positively rotating said head in unison with the case when said case is turned about the shaft, and links operatively connecting the nuts to the plates for expanding and contracting the head when said head is rotated in opposite directions on the shaft.

References Cited in the file of this patent
UNITED STATES PATENTS

| | | |
|---|---|---|
| 1,033,687 | Fish | July 23, 1912 |
| 2,352,703 | Fries | July 4, 1944 |
| 2,413,103 | Forbes | Dec. 24, 1946 |
| 2,461,839 | Neutelings | Feb. 15, 1949 |
| 2,672,161 | Brauer | Mar. 16, 1954 |
| 2,687,763 | Perkins | Aug. 31, 1954 |